United States Patent
von Orelli et al.

(10) Patent No.: US 6,590,648 B1
(45) Date of Patent: Jul. 8, 2003

(54) APPARATUS FOR MEASURING LIGHT

(75) Inventors: Adrian von Orelli, Zürich (CH); Peter Ehbets, Zürich (CH)

(73) Assignee: Gretag-Macbeth AG, Regensdorf (CH)

( * ) Notice: Subject to any disclaimer, the term of this patent is extended or adjusted under 35 U.S.C. 154(b) by 538 days.

(21) Appl. No.: 09/607,281

(22) Filed: Jun. 30, 2000

(30) Foreign Application Priority Data

Jul. 6, 1999 (EP) .............................. 99113557

(51) Int. Cl.$^7$ .................................. G01J 3/28
(52) U.S. Cl. ....................... 356/328; 356/326
(58) Field of Search ................ 356/326, 328, 356/402; 348/191; 702/189

(56) References Cited

U.S. PATENT DOCUMENTS

| | | | |
|---|---|---|---|
| 5,168,320 A | * 12/1992 | Lutz et al. | 356/73 |
| 6,067,166 A | * 5/2000 | Fox et al. | 356/402 |
| 6,163,377 A | * 12/2000 | Boles et al. | 356/402 |
| 6,338,030 B1 | * 1/2002 | Senn et al. | 702/189 |
| 6,493,084 B1 | * 12/2002 | Friend et al. | 356/402 |

FOREIGN PATENT DOCUMENTS

| | | |
|---|---|---|
| DE | 36 22 043 | 1/1988 |
| DE | 196 33 557 | 3/1998 |
| EP | 0 064 024 | 11/1982 |

* cited by examiner

Primary Examiner—Alan A. Mathews
(74) Attorney, Agent, or Firm—Cummings & Lockwood

(57) ABSTRACT

A measuring device for emitted, remitted or transmitted light from a measuring object is provided having an optical detector for capturing light to be measured, said light being radiated from the measuring object; a spectrometer optically connected with the detector for dispersing the measuring light into its spectral components, said measuring light being captured by the detector, said spectrometer including a photo-electric converter for generating respective analog electrical signals from the spectral components of the measuring light; an analog/digital converter for converting the generated analog electrical signals into respective digital measurement data, said analog electrical signals being generated by the photo-electric converter; a digital computer for controlling the photo-electric converter and the analog/digital converter; a bidirectional interface for connecting the computer with an external computer; and a program for controlling the computer, said program for communicating between the computer and the external computer via the interface, wherein the external computer starts measuring processes and transfers the thus generated digital measurement data to the external computer via the interface. The interface is a USB or Fire Wire interface and the power supply to all electrical components of the measuring device is carried out through the interface. Therefore a power supply circuit is provided which is connected to the interface for generating the necessary supply voltage for each of the individual electrical components of the measuring device from the supply voltage being supplied by the external computer via the interface. The use of a USB or Fire Wire interface allows the processing of the measurement data to be transferred into the external computer, thus allowing a particularly cost efficient manufacturing of the device so that the device becomes available to a wide range of users.

15 Claims, 6 Drawing Sheets

Fig. 7
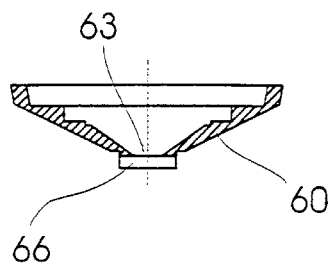
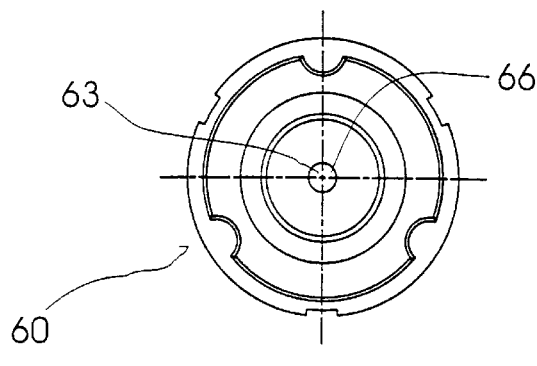
Fig. 8
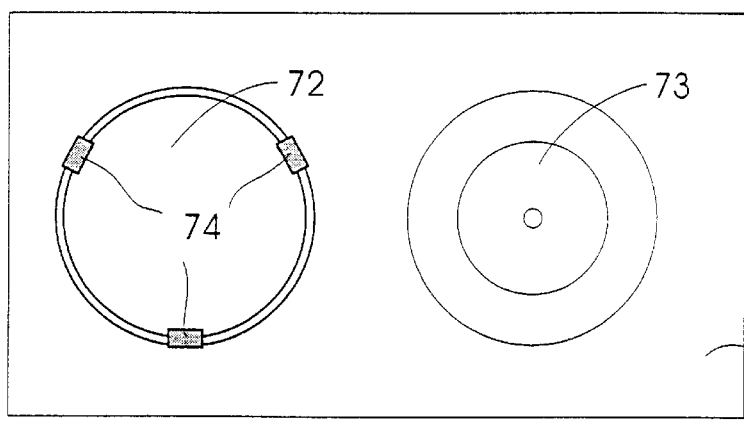
Fig. 9
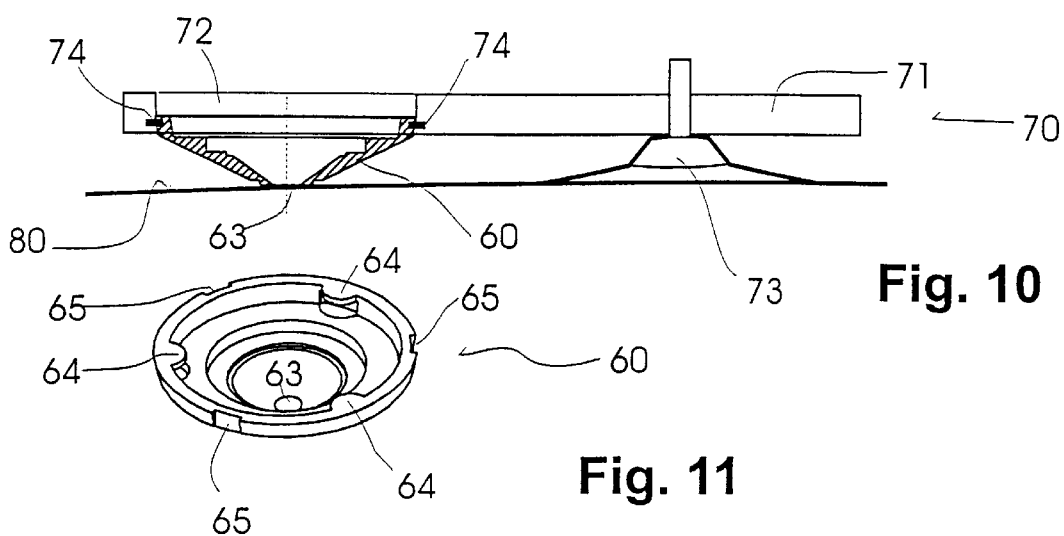
Fig. 10
Fig. 11

APPARATUS FOR MEASURING LIGHT

This application claims priority under 35 U.S.C. §§119 and/or 365 to 99 113 557.5 filed in Europe on Jul. 6, 1999; the entire content of which is hereby incorporated by reference.

FIELD OF THE INVENTION

The invention relates to an apparatus for measuring light that is emitted, remitted, or transmitted from a measuring object.

BACKGROUND OF THE INVENTION

The so-called color management, i.e. the mutual tuning of all color capable computer peripheral devices (monitor, scanner, printer etc.) as well as the communication of reliable color values gains an increasingly great importance in the course of the continuous further distribution of color capable computer peripherals.

The creation of manufacturer specific device profiles or the creation of device profiles that correspond to a standard (e.g. ICC) is a central point of the color management. These device profiles allow for the conversion of device specific color values to device independent color values and hence into generally valid color values. The creation of device profiles is based on the characterization of the colorimetric properties of the input and output devices, such as color printer and scanner. This requires the colorimetric evaluation of color test cards (so-called test charts), such as described in the ISO standard IT8. One such test chart is composed of several hundreds of test fields. With the available portable measuring devices, the manual measuring of all test fields of a test chart requires a lot of work and time. This is due to the required precise manual positioning of the measuring device on the measuring field and the measurement time per color field which can last from one to several seconds. Even though the measuring of a test chart can be automated using a computer controlled XY-shifting table, it can be accelerated only insignificantly. Furthermore, such a XY-shifting table is very expensive.

The characterization and calibration of monitors is carried out by means of a direct measurement of the light emitted from the monitor. In doing so, the measuring device is commonly fastened to the screen of the monitor by means of a suction cup, for example.

The following basic requirements on a measuring device for color management can be derived from the steps described: the measuring device must have a flexible measuring geometry for the characterization of the different input and output devices (emission and remission) as well as a simple and efficient capacity for reading in one-dimensional and two-dimensional color test cards.

Existing color management solutions require several different measuring devices and apparatuses and are usually relatively expensive. The high purchase price of the measuring devices in comparison to peripheral devices restricts the use of color management to high end applications. Existing low cost color measuring devices require too much work for the creation of device profiles and thus have only a limited suitability for this application.

A characteristic feature of existing portable color measuring devices is a classical serial interface through which the device-internal and computer-based controller can communicate with a connected external computer. Communication means amongst other things, that measuring processes can be initiated and controlled by the external computer on one hand, and on the other hand the thus obtained measurement data transferred to the external computer, for example for further processing. The communication is controlled by corresponding software which is permanently stored in the color measuring device and loaded into the external computer when needed. Furthermore, data (e.g. measurement parameters) and if necessary specific software can be loaded from the external computer into the internal computer of the measuring device. Finally it is possible to manually trigger measuring processes at the measuring device itself.

Typical representatives of existing measuring devices that are designed to be portable are the "Colortron" (U.S. Pat. No. 5,684,582), the disclosure of which is hereby incorporated by reference in its entirety, the "Digital Swatchbook" of the X-Rite company, and the "Spectrolino" of the applicant. As a low cost device, the "Colormouse too" of the ColorSavvy company is mentioned.

The mentioned devices are different from each other by the type of their spectral analyzers. The "Swatchbook" is based on a greater number of narrow-band interference filters which are installed on a rotatable disk that is arranged in the path of the beam. This concept is not suitable for the measurement of narrow emission lines of CRT monitors because of the coarse wavelength resolution.

The "Colortron" is based on a classical lattice monochromator combined with a receiver diode. This architecture evaluates the different wavelengths in a chronologically sequential manner. This leads to long measuring times during remission measurements. When performing emission measurements on the monitor, the measurement times are impractically long.

The spectral separation in the "Colormouse too" device is achieved through illumination by using different light emitting diodes (LED). The low illumination power of the LED combined with sequential measurements at different wavelengths leads to long measuring times. This measurement principle can inherently not be used for wavelength selective emission measurements.

The "Spectrolino" of the applicant is based on a conventional diode array spectrometer which allows for short measuring times based on the simultaneous measurement of all wavelengths and can be used for emission measurements as well as remission measurements. Presently commonly used manufacturing technologies for diode array spectral modules cause relatively high costs and hence are unsuitable for a low cost device.

Today, the measurement off a complete test chart is carried out using time intensive manual performances of individual measurements which are carried out line-by-line using a device exclusively specialized for this application (e.g. DTP 41 by X-Rite) or fully automatic using a measuring device that is mounted on a computer controlled XY-table (e.g. Spectrolino-Spectroscan by the applicant). "Scanning" color measuring devices that are mounted on a computer controlled measuring table are already mostly known in the printing industry and are described, for example, in EP-A 0064024, the disclosure of which is hereby incorporated by reference in its entirety.

A manually moved "scanning" portable measuring device is the subject of DE-A 197 16 066, the disclosure of which is hereby incorporated by reference in its entirety. The device described therein is moved parallel to its longitudinal edge during use, which is not optimal from an ergonomic point of view. It evaluates the received data for the measuring field recognition using the computer available in the detector. This requires the use of an extremely efficient small computer in the measuring device because of the high measuring speed. This concept can not be used in a low cost device.

It is an object of the present invention to improve a measuring apparatus of this type such that the constructive and conceptional prerequisites are created for a portable measuring device which is extremely affordable to produce and with which all necessary measurements for a complete color management process can be carried out in an efficient and precise manner. The measuring apparatus can perform approximately 100 measurements per second in a continuous measuring mode which allows for the automatic recording of several color fields through a manual pass across the color fields using the detector of the apparatus. In addition to its capability of being produced in an affordable manner, the measuring apparatus can be designed in a small and manageable manner, can be user friendly and not require maintenance, and thus can be generally available to a wide range of users.

SUMMARY OF THE INVENTION

In accordance with an embodiment of the invention the bidirectional interface is designed as a USB interface or fire wire interface which provides the technical requirements for a fundamentally different type of architecture (conception) of the measuring apparatus. This architecture reduces the required computing resources in the measuring apparatus to an absolute minimum and thus provides for a particularly affordable production of the apparatus. This reduction is achieved in accordance with a further embodiment of the invention by consequently swapping the digital data analysis into the connected host computer. The measuring apparatus itself only serves for the acquisition of raw data and their digitization, which massively reduces the production costs. The analysis of the data is carried out in the connected host computer making optimal use of resources (computer speed, storage capacity etc.) available in today's personal computers. These resources are several times larger than the resources of the computers typically used in portable measuring devices. They allow for a real-time analysis of the raw data using more sophisticated algorithms than would be possible in portable measuring devices (at justifiable cost). The swapping of the data analysis into the external host computer further allows that the measuring apparatus, regardless of its relatively low computer resources, can be designed such that it can carry out approximately 100 measurements per second in a continuous measuring mode. This speed allows for an automatic capture of several color fields through a manual passing across the color fields using the detector of the measuring apparatus.

Because of the transfer of all raw data at a desired high measuring speed in the "scanning" mode, the architecture of the measuring apparatus in accordance with the invention requires a significantly higher band width for the data interface than the one provided in conventional devices commonly using a serial interface. Thus, the measuring apparatus in accordance with the invention uses a USB or Fire Wire (IEEE 1394) interface for the transfer of data from and to the external host computer.

The measuring apparatus in accordance with another important aspect of the invention is designed such that it can be supplied with energy through the interface (USB or Fire Wire) so that it will not need an additional (external) power supply which allows for a further reduction in costs.

The short measuring periods in remission measurements required for the scanning mode require a high intensity of illumination at a stable color temperature and intensity. These conditions can be fulfilled in a known manner using a precision incandescent lamp having an electrical power of at least 1.5 Watt and special control electronics.

When the incandescent lamp is turned on, significantly more power needs to be applied than is needed in the following stationary mode. This causes the following problem when using a USB interface: the USB standard allows in a "High Power Device" a maximum electrical power consumption of 2.375 W. This is sufficient for the power supply of the internal computer and the stationary mode of the lamp, but during the turn-on phase of the lamp it is much too little. This problem is solved in accordance with a further aspect of the invention in that the measuring apparatus is equipped with an energy storage device, which is charged before the lamp is started and then supplies the required additional electrical power before and until the stationary state is reached. Thus, the incandescent lamp can be dimensioned such that it can absorb the maximum available power and hence can fulfill the above mentioned requirements.

A further reduction in costs is possible when equipping the spectrometer module of the measuring apparatus with a special thermal drift compensation that allows for an affordable assembly of the spectrometer from plastic material using an injection molding procedure. A spectrometer with such a thermal drift compensation is for example described in applicant's U.S. patent application Ser. No. 09/538,236 of Mar. 30, 2000 (corresponding to EP Patent Application No. 99106111.0 of Apr. 01, 1999).

For the measurement of colored lines in the scanning mode, the user needs an aid which eases the guidance of the measuring opening of the measuring device along the colored line. In accordance with a further aspect of the invention the detector of the measuring device is equipped with a tubular extension which is substantially shaped like a pipe connector. The tubular extension contains the measuring opening and can be mechanically interlocked with an elongated guide slot of a ruler-like shifting guide. The tubular extension forms so to speak a mechanical interface to the shifting guide. The guide slot of this shifting guide functions as an aperture and allows visual control of the positioning of the detector on the measurement line. In the interlocked condition, the measuring device is limitedly rotatable around its longitudinal axis (optical axis of the detector) relative to the shifting guide and can be shifted along its lateral axis along the guide. For doing so, the shifting guide is held with one hand and the measuring device is held with the other hand. The shifting guide itself has a stiff rotatably mounted shaft with two rollers arranged at the ends which exclusively allows the parallel shifting of the guide and thus eases the positioning of the guide during the measurement of a two-dimensional test chart.

In accordance with a further advantageous embodiment, the detector or measuring tube has at its bottom end a further mechanical interface, e.g. a bayonet connection, which allows that a device (e.g. a suction cup) for the fastening of the device can be fastened to the screen of a monitor. The measuring tube is exchangeable and can be replaced with another one, for example one that is provided with a diffuser platelet for the measurement of the spectral composition of the surrounding light in front of the measuring opening.

Thus, the measuring apparatus in accordance with the invention is a portable measuring device that can be manufactured in a cost efficient manner and with which all necessary measurements for a complete color management process can be carried out efficiently and precisely. It is designed such that it can perform approximately 100 measurements per second in a continuous measuring mode. This speed permits the automatic capture of several color fields by manually passing over the color fields using the detector of the device. The measuring device in accordance with the invention offers for the first time a complete low cost color management solution based on an individual compact measuring device, which can be produced in a cost efficient manner and fulfills all described requirements for an efficient use in the area of color management. Through the combination of sequential measurements that can be executed at a high speed and a simultaneous manual shift of the detector one obtains a scanning system which measures a whole row of color fields with one movement. In doing so, an automatic recognition of the color fields is achieved later through analysis of the continuously captured measurement values.

BRIEF DESCRIPTION OF THE DRAWINGS

The above objects and features of the present invention will be more apparent from the following description of the preferred embodiments with reference to the accompanying drawings, wherein:

FIG. 7 shows an axial sectional view through a further embodiment of the tube of the detector;

FIG. 8 shows an axial inner view of the tube of FIG. 7;

FIG. 9 shows an underneath view of a holder for the fastening of the measuring device on the seen of a monitor;

FIG. 10 shows a sectional view of the holder in a fastened state at the tube of the detector; and FIG. 11 shows an inclined view of a tube of the detector of the measuring device.

DETAILED DESCRIPTION OF THE INVENTION

Figure 5:
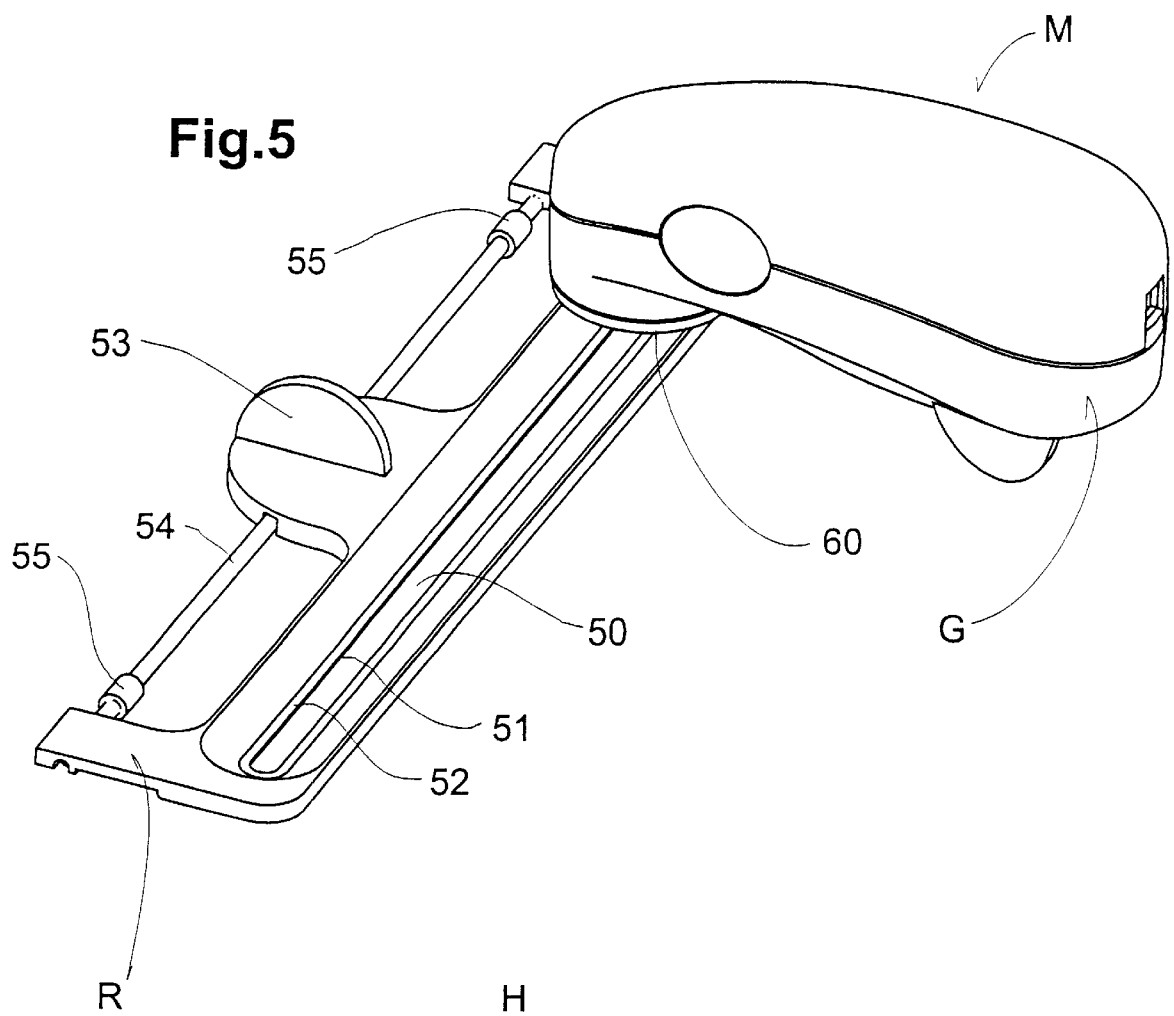
FIG. 5 shows a schematic view of the measuring device in combination with a shifting guide.

The presented measuring device in accordance with the invention is.designated with M in its entirety and substantially includes an optical detector H, a spectrometer S, and control electronics E, which are all placed in a small portable housing that can be seen in FIG. 5.

The optical detector H is a conventional one and designed according to international standards and contains an optical arrangement 1 for capturing the remitted, transmitted, or emitted measurement light coming from a measuring object T to be measured, and for coupling of the captured measurement light into a light guide L which optically connects the detector H with the spectrometer S. In the case that the detector H is designed for remission measurements, it further contains a lamp 2 and accompanying optical means, which are not presented in the drawing, for hitting the measuring object T with light using known standard conditions. The detector H can be designed, as shown in the embodiment, for remission measurements or it can be specifically adapted for use in transmission and emission measurements. The measuring device M can also further be equipped with several, exchangeable detectors H that are adapted for different measuring purposes. Alternatively, the detector H can be equipped with two or several exchangeable and fastened tube-shaped adapters at its lower end, which are adapted for different uses in measurements. Two typical embodiments of such an adapter are presented more closely in FIGS. 7 to 11.

The spectrometer S is also a conventional one and substantially contains a concave reflection diffraction grating 3 as a wavelength selective element as well as a photoelectric transducer in form of a linear photo diode arrangement 4. The measurement light which is captured by the detector is coupled into the spectrometer S via the light guide L and is guided to the diffraction grating 3. This reflects it in a wavelength dependent manner to the photo diode arrangement 4, wherein the individual photo diodes of the arrangement 4 receive light of different wavelength ranges and thus generate electric signals in correspondence to the spectral portions of the measurement light. The typical resolution is approximately 10–20 nm for a wavelength range of ca. 380–730 nm.

In a preferred embodiment the spectrometer is provided with a temperature drift compensation which is described in U.S. patent application Ser. No. 09/538,236 of Mar. 30, 2000 (corresponding to EP Patent Application No. 99106111.0 of Apr. 01, 1999) the disclosure of which is hereby incorporated by reference in its entirety, and allows that the spectrometer can be made using a plastic material injection molding technique and hence can be manufactured in a particularly cost efficient manner. Alternatively, other spectrometer types can be used, such as Fourier-Transform, Fabry-Perot, prism, graduated filter, and several interference filters.

The control electronics E is also conventional in its principal function, as far as it concerns the actual process of measuring. It contains a digital computer 10 (micro computer) of a known type with accompanying software (program) and serves to control the lamp 2 and the photo diode arrangement 4 for converting the electrical signals generated by the photo diode arrangement 4 into corresponding digital measuring data and also for the communication with an external computer C (host) via an interface 5 that is designed as a USB interface (universal serial bus) in accordance with a first aspect of the invention. The external computer (host) C, of course, must also have a corresponding USB interface 5'. The connection between external computer (host) C and the measuring device M occurs through a suitable cable K. Alternatively, the interface can also be designed as a so-called Fire Wire (IEEE 1394) interface or as another bidirectional high capacity data interface having at least a similar data transfer capacity.

Figure 1:
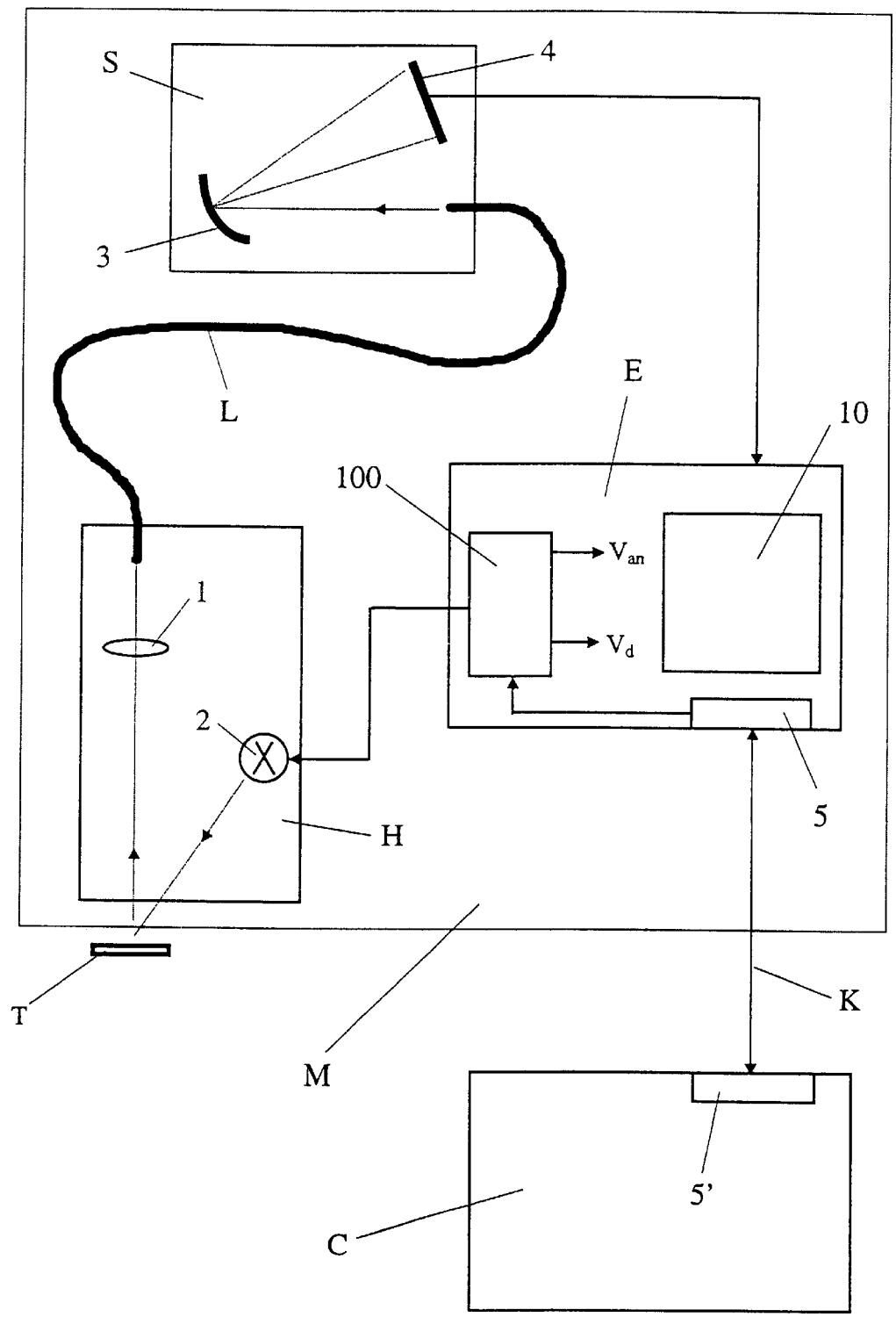
FIG. 1 shows a principle scheme of the measuring device in accordance with the invention.
Figure 2:
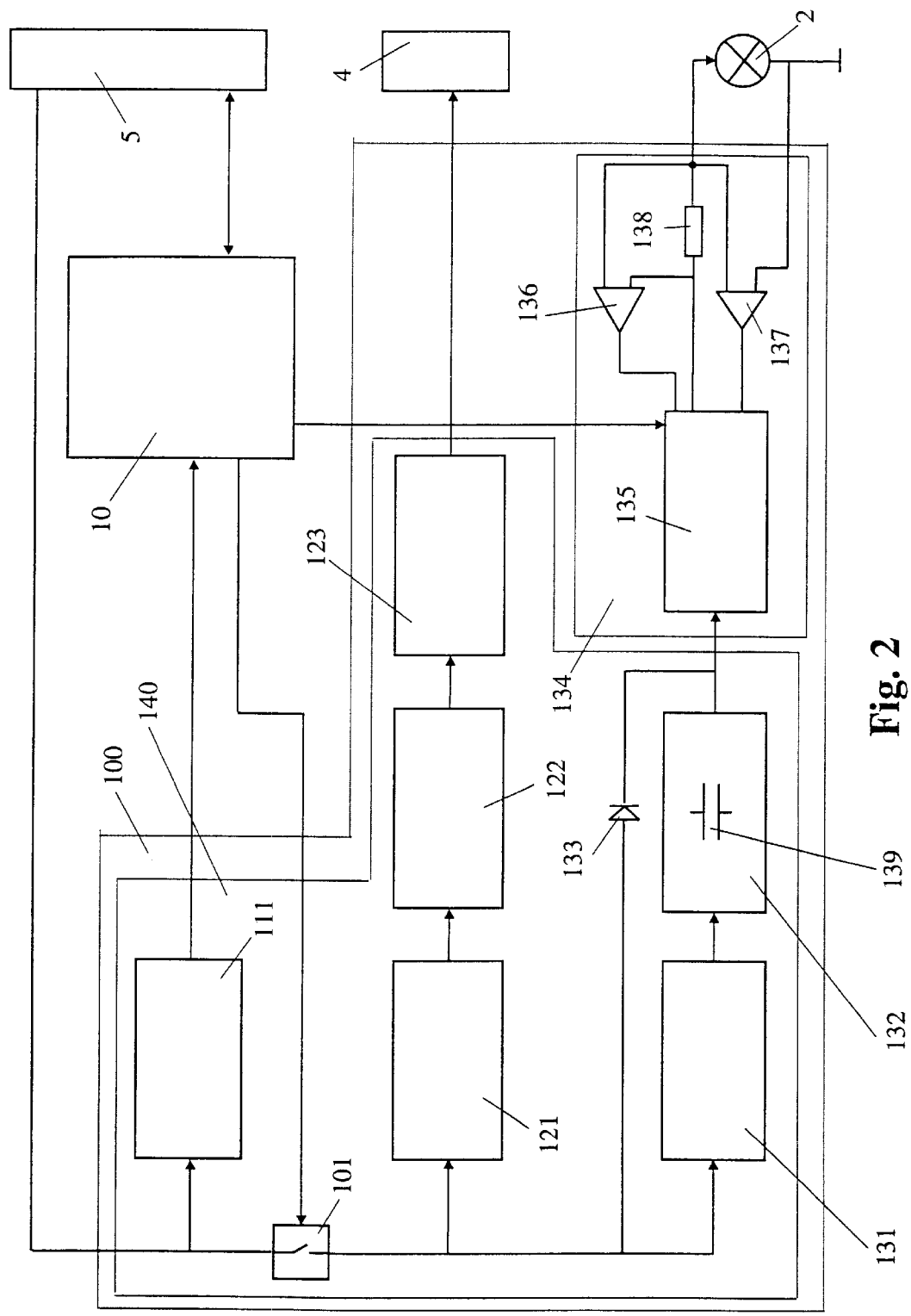
FIG. 2 shows a schematic representation of the power supply circuit that is present in the control electronics of the measuring device.

A further important aspect of the present invention is that the measuring device does not have its own power supply but rather takes the required energy for the operation from the USB or the Fire Wire interface 5 (when the measuring device is connected to an external computer). For this purpose, the control electronics E is equipped with a power supply circuit 100 which generates the necessary supply voltage from the standardized supply voltage supplied through the USB or Fire Wire interface or through the USB or Fire Wire interface of the external computer to all individual components of the measuring device M, in particular the internal computer (micro computer) 10, the photo diode arrangement 4, and the lamp 2. The set-up of this power supply circuit is explained in the following with respect to FIG. 2.

The power supply circuit 100 is directly connected with the connectors of the USB interface 5 of the measuring device M. These connectors carry the standardized USB supply voltage. The power supply circuit is basically divided into three branches.

In a first branch there is a linear voltage controller 111 which generates the supply voltage $V_d$ for the internal computer 10 and its accompanying digital components and peripheral modules. The other two branches are connected to the USB interface 5 through a switch 101 which is controlled by the internal computer 10.

As soon as the internal computer 10 is supplied with voltage it establishes a connection with the host computer. As soon as the internal computer, in accordance to USB standards, receives the confirmation for the requested electrical power from the host, it closes switch 101 and thus feeds the USB supply voltage to the other two branches.

The second branch of the power supply circuit 100 includes a direct voltage converter 121, a linear voltage controller 122, and a smoothing filter 123, and generates the supply voltage $V_{an}$ for the photo diode arrangement 4 and also for possible analog components of the control electronics E.

The third branch of the power supply circuit includes a direct voltage converter 131, an electrical storage stage 132, a diode 133 that functions as a bridging switch, and a lamp driver stage 134 controlled by the internal computer 10. The lamp driver stage 134 itself typically includes a voltage and current controlled direct voltage converter 135, two differential amplifiers 136 and 137, and a current sensing resistor 138.

The components 111, 121–123, and 131–133 of the power supply circuit 100, i.e. all components except for the lamp driver stage 134, that actually supply the supply voltage are overall denoted with 140.

The lamp driver stage 134 is conventionally constructed and hence does not need further explanation. It limits the current through the lamp 2 during the heating up phase of the lamp filament and keeps the voltage of the lamp at a constant value afterwards.

The computer 10 initiates the switching on and off of lamp 2 via the lamp driver stage 134 in a generally known manner.

The current demand during the heating up phase of the lamp filament of lamps typically used in measuring devices of the present type exceeds the power which can be maximally supplied through a standard USB interface by approximately a factor of 2. Therefore, in accordance with a further important aspect of the invention an electrical storage stage 132 is provided. The electrical storage stage 132 is charged to a higher voltage than the USB supply voltage using the direct voltage converter 131 during the phases in which lamp 2 is not switched on, and covers the increased energy demand of the lamp during its switching on phase. Once lamp 2 burns stable it is supplied directly with the USB supply voltage via the bridging switch 133 (and the lamp driver stage 134). The electrical storage stage 132 is basically conventional and contains a storage capacitor 139 as a basic element.

The direct voltage converters (DC/DC converter) 121 and 131 convert the supply voltage that is supplied to them into a higher direct voltage. Such direct voltage converters are known to a person of skill in the art and therefore do not require a special explanation. This applies analogously to the linear voltage controllers 111 and 122.

Figure 3:
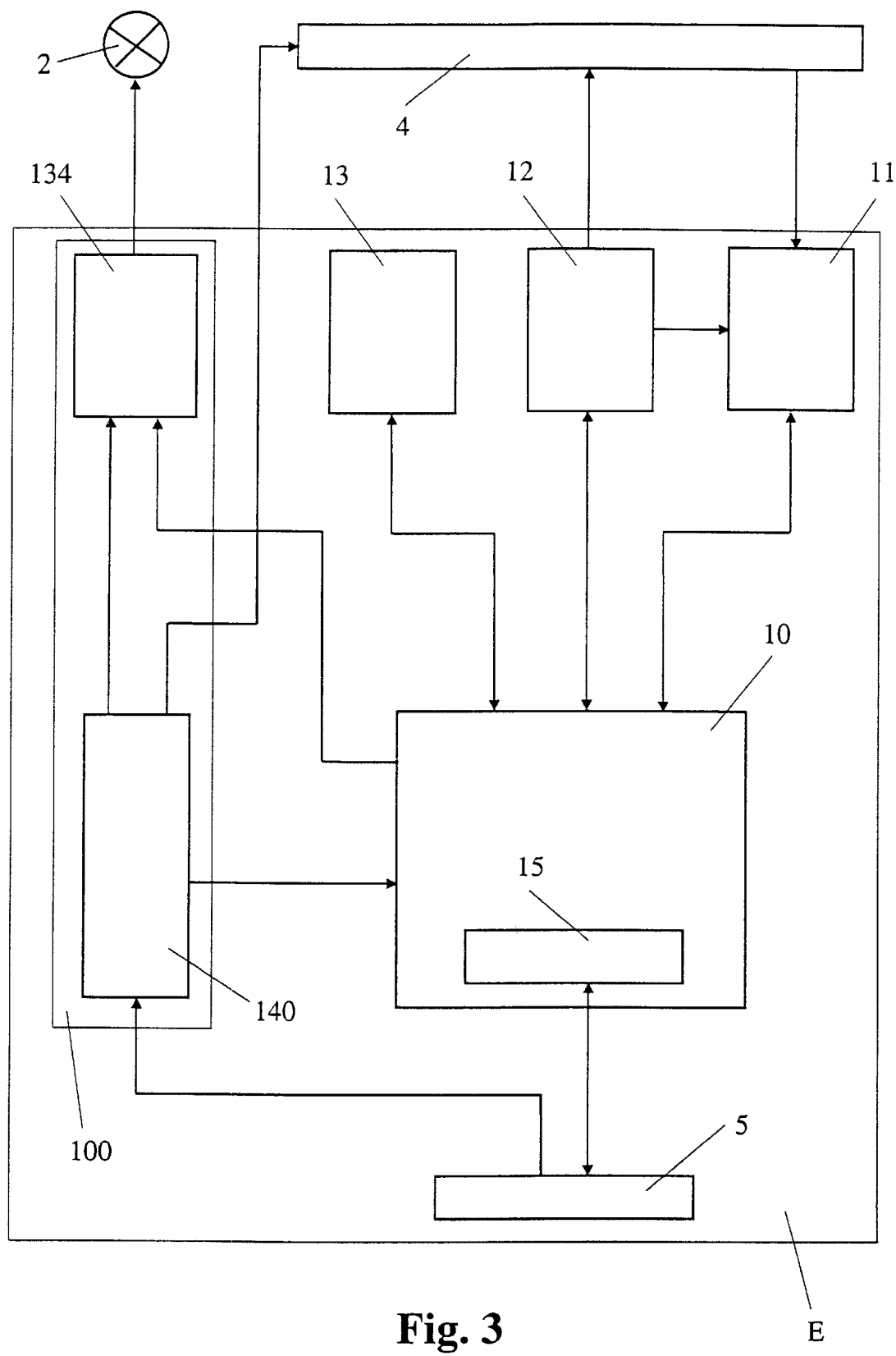
FIG. 3 shows a schematic representation of the control electronics of the measuring device.

FIG. 3 presents a block diagram of the control electronics E. The control electronics E include, aside from the already mentioned internal digital computer (micro computer) 10 and the power supply circuit 100 as well as the solid USB interface 5, an analog/digital converter 11, a clocking generator 12, and a non-volatile storage (EEPROM) 13. Further, a USB status automation (USB engine) 15 is implemented in the computer 10 in accordance with USB standards. The clocking generator 12, which is controlled by computer 10, generates the required clock pulses for the operation of the photo diode arrangement 4 and the analog/digital converter 11 in a known manner. The analog/digital converter 11 converts the analog electrical signals which it reads from the photo diode arrangement 4 and which correspond to spectral portions of the measuring light into corresponding digital measurement data. Specific calibration data for the measuring device are stored in the non-volatile storage 13 (for the required and basically known and conventional calibration of the photo diode arrangement).

The above embodiments apply in an analogous manner also to a Fire Wire interface.

Figure 6:
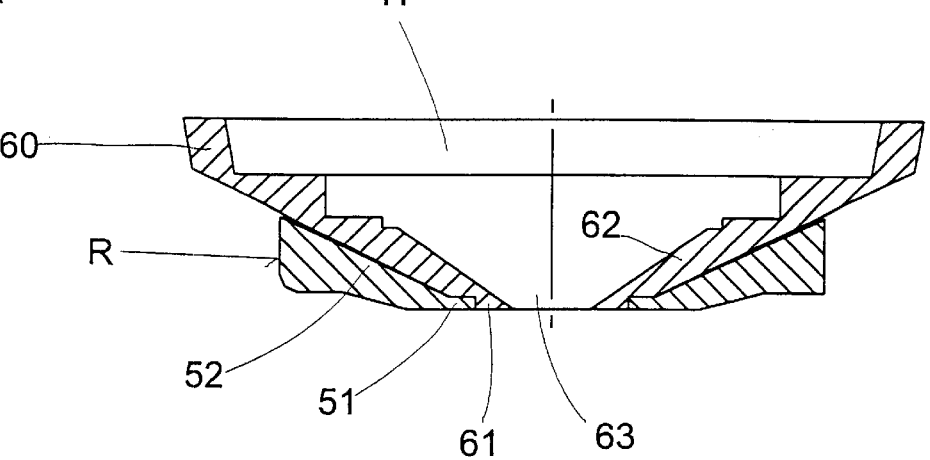
FIG. 6 shows a detailed sectional view through the detector of the measuring device having a shifting guide.

For the measurement of colored lines in the scanning mode it is necessary for the user to have an aid which eases the guiding of the measuring opening of the measuring device along the colored line and which eases the positioning of a two-dimensional test chart. A particularly useful and advantageous aid is presented in FIGS. 5 and 6 in form of a shifting guide R.

The shifting guide R is designed in an elongated ruler shape and has an elongated guide slot 50 which substantially spans the length of the shifting guide. Further, the shifting guide R is provided with a gripping member 53 and a rotatably mounted shaft 54 that is parallel to the guide slot 50. Two rollers are non-rotatably fastened to both ends of the shaft 54. In this manner, the shifting guide R can be parallel shifted on a base and perpendicular to the longitudinal direction of the guide slot 50.

The guide slot 50 has a funnel-shape in cross-section (perpendicular to its longitudinal direction), i.e. it has a (in respect to the base) narrow steep faced section 51 and an upper section 52 which extends itself in a flat v-shaped manner.

At its lower end, the detector H of the measuring device has a mechanical interface to the shifting guide R or its guide slot 50. Concretely this means that the detector H is provided with an adapter or a tube 60 at its lower end, which has a conical section 62 and a (outer) cylindrical section 61, that are designed similar to the profile of the guide slot 50 of the shifting guide R. In the centre of the cylindrical section 61 of the tube 60 there is a measuring opening 63. The adapter or the tube 60 are themselves designed such that they can be exchanged, as is particularly apparent from FIG. 11, by means of bayonet blades 64 that are protruding to the interior and which latch into bayonet-slits (not shown) provided at the lower end of the detector M, such that it can be fastened to the detector or again removed therefrom.

The measuring device M can be interlocked (FIG. 6) with the shifting guide R or its guide slot 50 with the adapter or tube 60 of its detector H. The measuring device M is limitedly rotatable about its longitudinal axis (optical axis of the detector and at the same time the axis of the cylindrical section 61 of tube 60) relative to the shifting guide and can be shifted around its lateral axis along the gage. Thus, the shifting guide R is held with one hand during a practical application and the measuring device is held with the other hand.

In a practical application, the shifting guide R is positioned on the base to be measured such that its guide slot 50 is substantially aligned with the center of the colored measuring line to be measured and that it is visible therethrough. The guide slot 50 which serves as an aperture thus allows visual control of the positioning of the detector on the measurement line. Through a manual parallel shifting of the shifting guide R it is possible to quickly and unerringly start and measure sequentially all colored measuring lines of a test chart.

In accordance with a further advantageous embodiment, the detector or the tube that is exchangeably fastened to the detector has a fastening member or more generally a further mechanical interface which allows that a holding device for the fastening of the measuring device can be fastened, for example, to the screen of a monitor or in another embodiment to an LCD display. This is shown in more detail in FIGS. 9 and 10 for the example of fastening to a monitor.

The in its entirety with 70 denoted holding device consists basically of a planar plate 71 in which there is an opening 72 that is fitted to the diameter of the tube and which further has a suction cup 73 fastened thereto. In the area of the opening 72 there are three inwardly protruding bayonet blades 74 which cooperate with bayonet slits 65 that are provided on the outer circumference of tube 60. In this manner, the plate 71 can be mounted on tube 60 using suction cup 73 and can also be removed therefrom again. For measurements on a monitor, the holding device 70 is fixed to the tube 60 of the measuring device M and then the suction cup 73 is fastened to screen 80 of the monitor. Thus, the entire measuring device M is fastened to the monitor through the holding device 70.

FIGS. 7 and 8 show an embodiment of the adapter or tube 60 which is specifically adapted for measurements of surrounding light. In this embodiment, the measuring opening 63 of the tube is covered with a scatter disk 66. Otherwise, the tube 60 is designed similar to the one shown in the remaining figures.

The spectral composition of the ambient light can be measured with this tube. The knowledge of the spectral composition of the ambient light can for example be used for the simulation of the influence of illumination/lighting on the appearance of a color pattern. Also, the suitability of a certain type of illumination/lighting for obtaining the pattern can be evaluated with this aid.

The principal functionality of the measuring device is explained in the following.

The measuring device M is at first connected to the USB interface 5' of the external computer C by means of a cable K. According to standard USB protocol, the external computer C then begins the enumeration process and determines the actual (USB) device number of the connected measuring device, such that it is identified as a peripheral device. The external computer then starts a device driver which is stored in the computer and is assigned and configured for the identified peripheral device. This device driver loads the calibration data, which were stored in the non-volatile storage 13 of the measuring device, into the external computer. Finally, the control electronics E of the measuring device initializes and performs a self test. From this moment on, the application software (application program), which is loaded in the external computer, can communicate with the measuring device.

Figure 4:
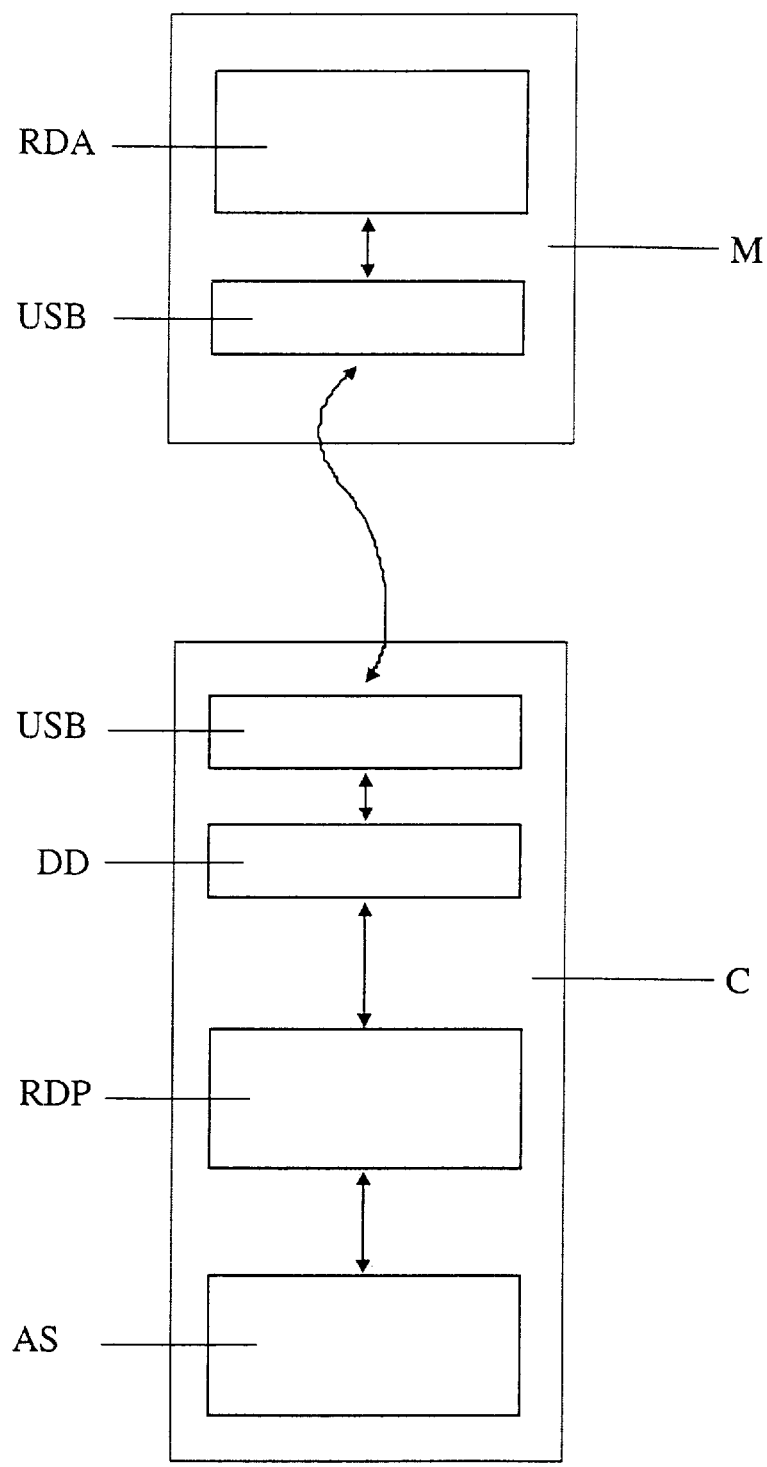
FIG. 4 shows a schematic representation of the program architecture.

The basic software (program) architecture for the operation of the measuring device is schematically illustrated in FIG. 4.

The software RDA that is required for the capture of raw (uncalibrated) measurement data as well as the USB protocol USB for selecting the USB interface are situated in the measuring device. In the external computer (host) C there is a respective USB protocol USB and the mentioned device driver DD, a processing program RDP for the raw measurement data (calibration using the calibration data that were initially loaded into the external computer, calculation of for example colorimetric data (color values) from the calibrated measurement data) that are generated by the measuring device M and are transferred into the external computer, and an application program ASW, which puts a user interface at the disposal of the measuring device and which further processes the measurement data, which were calculated and conditioned by the processing program, in a desired manner. For example, the application program can display determined color values on the screen in different representations. The USB protocol is an industry standard and therefore does not require an explanation. This applies analogously to the use of a Fire Wire interface. The remaining programs are also known from conventional measuring devices of the generic type and therefore do not need a detailed explanation for the person skilled in the art.

A typical process for an individual remission measurement is as follows:

The application program ASW requires a measurement step after a respective operating member (measurement trigger button) has been activated either in the application program or in the measuring device M itself (not shown).

The external computer C sends the required measurement parameters (according to the desired measurement, e.g. integration time for the photo diode arrangement) to the measuring device M.

The measuring device adjusts the measurement parameters and starts the charging of the energy storage stage 132.

The external computer C orders the performance of a measurement.

The measuring device M performs at first a dark measurement and stores the raw measurement data, then switches on the lamp 2, performs the actual measurement, stores the measurement data determined therewith, switches the lamp off again, and prepares the raw measurement data from the dark measurement and the actual measurement for data transfer.

The external computer C transfers the provided raw measurement data into its memory and provides them to the data processing program.

The data processing program calibrates the raw measurement data by means of calibration data and calculates spectral data and colorimetric values, etc., from the calibrated measurement data of the dark measurement and the actual measurement using diverse algorithms.

The application program ASW uses these values according to its determination.

A continuous (serial) remission measurement occurs similarly, however, lamp 2 is not switched off between the individual measurements. The transfer of the raw data, for example, can be carried out between each subsequent measurement (integration duration). The dark measurement is only performed once.

Lamp 2 is not switched on for transmission and emission measurements, and for the calculation of colorimetric values, etc., different algorithms are used.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A measuring device for emitted, remitted, or transmitted light from a measuring object, comprising:

an optical detector for capturing light to be measured, said light being from the measuring object;

a spectrometer optically connected with the detector for splitting up the measuring light into its spectral components, said measuring light being captured by the detector, said spectrometer including a photo-electric converter for generating respective analog electrical signals from the spectral components of the measuring light;

an analog/digital converter for converting the generated analog electrical signals into respective digital measurement data;

a digital computer for controlling the photo-electric converter and the analog/digital converter;

a bi-directional interface for connecting the computer with an external computer and for providing a power supply to all electrical components of the measuring device, said bidirectional interface being a high capacity data interface;

a power supply circuit connected to the interface for generating the necessary supply voltage for the individual electrical components of the measuring device from the supply voltage being supplied by the external computer via the interface; and a program for controlling the computer, said program communicating between the computer and the external computer via the interface, wherein the external computer starts measuring processes and transfers the generated digital measurement data to the external computer via the interface.

2. A device as defined in claim 1, further comprising a non-volatile memory connected to the computer for storing calibration data specific for the measuring device, and wherein the program transfers the calibration data from the memory to the external computer via the interface.

3. A device as defined in claim 1, further comprising a lamp for illuminating the measuring object in remission measurements, and wherein the power supply circuit is constructed for receiving an electrical energy from the interface and for supplying an electrical energy to the lamp.

4. A device as defined in claim 3, wherein the power supply circuit includes an electrical storage stage for covering an increased energy demand of the lamp during a switching on phase of the lamp.

5. A device as defined in claim 1, wherein the spectrometer is provided with a housing made substantially from a plastic material, a concave reflection diffraction grating as a dispersing element, a linear photo diode arrangement as a photo electric converter, and a thermal drift compensation.

6. A device as defined in claim 1, wherein the device is configured to perform at least 100 measurements per second in a continuous mode of operation and for automatically capturing entire colored lines by passing over the colored lines with the detector.

7. A device as defined in claim 1, wherein the device is configured for only substantially capturing raw measurement data.

8. A device as defined in claim 1, wherein the detector further includes a tube at a lower end thereof, said tube being exchangeably fastened thereto, and said tube being provided with a measuring opening.

9. A device as defined in claim 8, wherein at least two different, alternatingly fastened tubes are provided, said tubes being adapted for different measurement applications.

10. A device as defined in claim 1, further comprising a guide member for linearly guiding the device across a planar base, wherein the detector of the device includes a mechanical interface for mechanically coupling the detector with the-guide member via the mechanical interface.

11. A device as defined in claim 10, wherein the detector further includes a tube at a lower end thereof, said tube being exchangeably fastened thereto, and said tube being provided with a measuring opening; and wherein the guide member is a shifting guide having a straight guide slot, said tube being interlockable in the guide slot, and wherein the tube forms the mechanical interface of the detector.

12. A device as defined in claim 1, further comprising a holding device for fastening the measuring device on the screen of a monitor or LCD-display, said holding device being releasably connectable to the measuring device.

13. A device as defined in claim 12, wherein the detector further includes a tube at a lower end thereof, said tube being exchangeably fastened thereto, and said tube being provided with a measuring opening, and wherein the holding device is releasably connectable to the tube.

14. A device as defined in claim 9, wherein one of the tubes is designed for measuring ambient light, said one tube being provided with a scatter disk.

15. A device as defined in claim 1, wherein the bidirectional interface is one of a USB interface and a Fire Wire interface.

* * * * *